(No Model.) 2 Sheets—Sheet 1.
W. MAIN.
SECONDARY BATTERY.
No. 401,290. Patented Apr. 9, 1889.
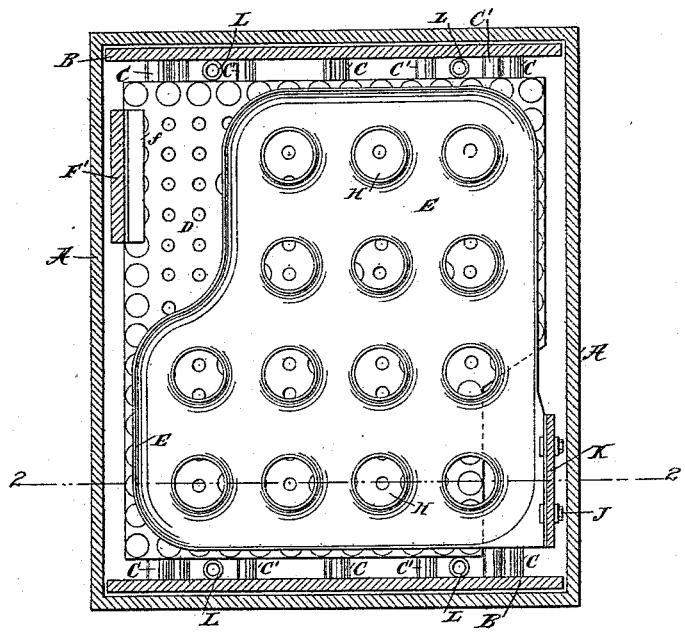
Fig:1.
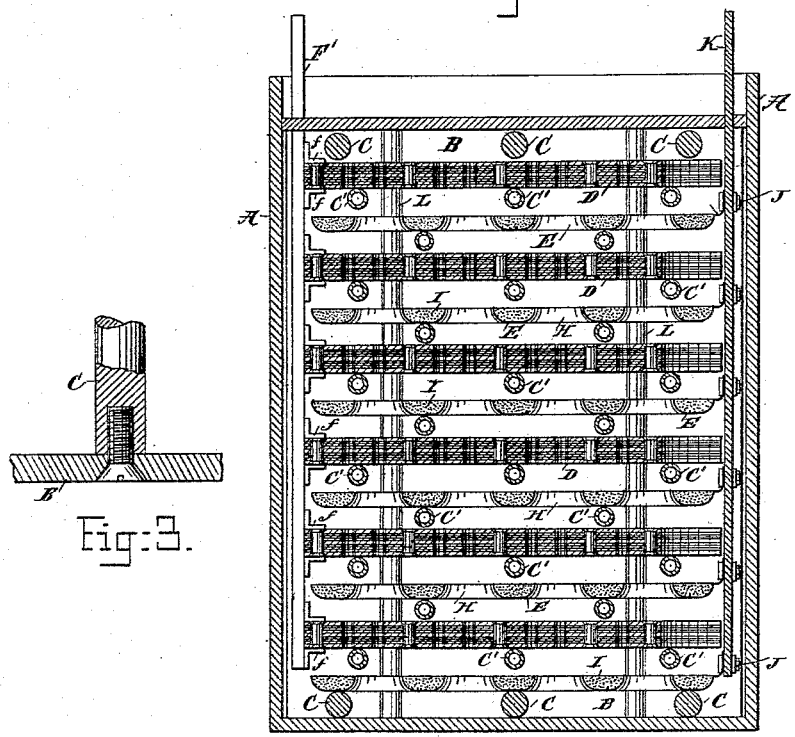
Fig:2.
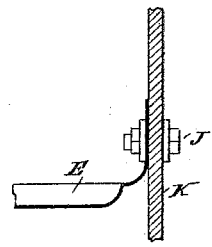
Fig:3.   Fig:4.
Witnesses  
Inventor  
William Main  
By his Attorneys Philipp, Philipp & Horny (No Model.) 2 Sheets—Sheet 2.
W. MAIN.
SECONDARY BATTERY.
No. 401,290. Patented Apr. 9, 1889.
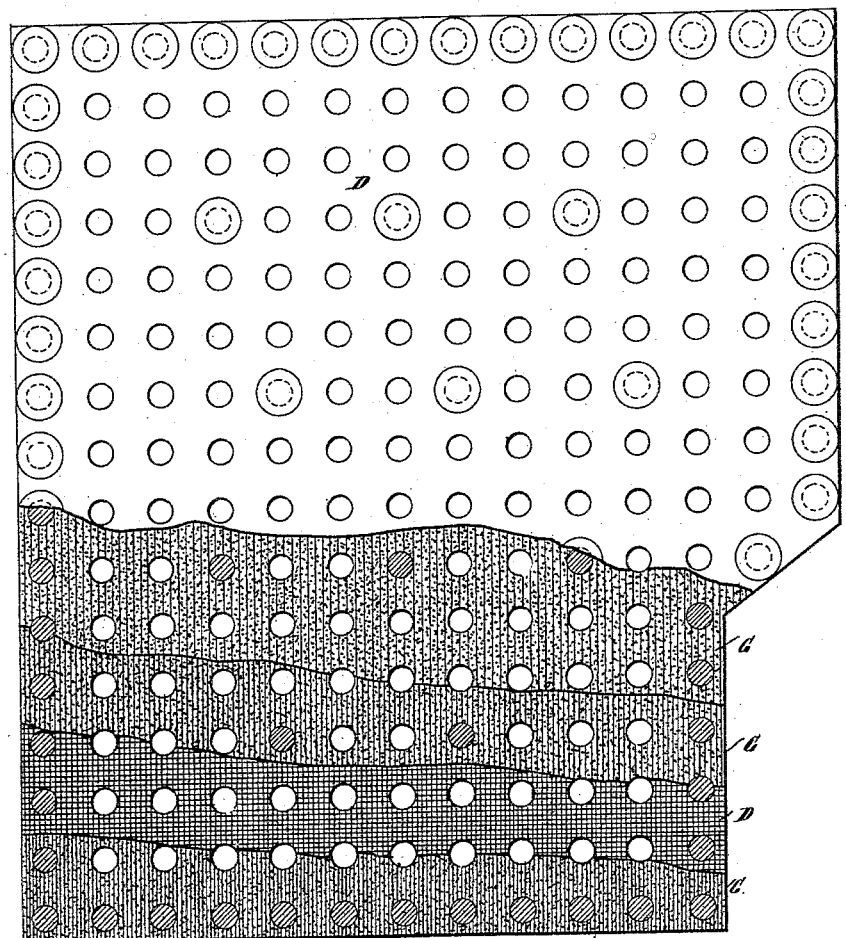
Fig: 5
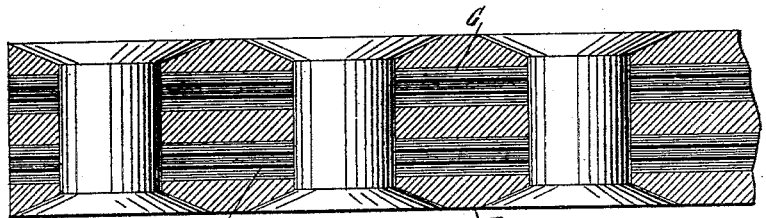
Fig: 6.
Witnesses
J. J. Kennedy
Geo. H. Botts
Inventor
William Main
By his Attorneys Philipp, Phelps & Horny

UNITED STATES PATENT OFFICE.

WILLIAM MAIN, OF BROOKLYN, NEW YORK, ASSIGNOR TO THE RIVER AND RAIL ELECTRIC LIGHT COMPANY, OF WEST VIRGINIA.

SECONDARY BATTERY.

SPECIFICATION forming part of Letters Patent No. 401,290, dated April 9, 1889.

Application filed January 10, 1889. Serial No. 295,959. (No model.)

*To all whom it may concern:*

Be it known that I, WILLIAM MAIN, a citizen of the United States, residing at Brooklyn, county of Kings, and State of New York, have invented certain new and useful Improvements in Storage-Batteries, fully described and represented in the following specification and the accompanying drawings, forming a part of the same.

My invention relates to secondary batteries and the construction of cells particularly designed therefor. It is to a certain extent an improvement upon a secondary-battery cell for which I have filed an application of even date herewith, No. 295,958, to which application I refer for full information with regard to the advantages of the general plan of construction herein described. In the said application cells containing two elements each are superimposed upon each other. In the battery now described the horizontal position of the elements shown in said application is retained, but several pairs of elements are associated in a single cell. This construction requires a less precise adjustment to each other of the various parts than where several cells are superimposed, and has the advantage of exposing both sides of each element to full electrical action. I also propose to use in connection with the material constituting the hydrogen pole-piece of the battery a metal plate or tray containing the same and increasing the electrical conductivity thereof. The battery which I hereby desire to patent has also other relative and independent merits, which I will further advert to after describing its construction.

In the drawings annexed, Figure 1 is a horizontal section of one of my improved cells. Fig. 2 is a vertical section of the same on the line 2 2, Fig. 1. Figs. 3 and 4 are details. Fig. 5 is a side view of one of the oxygen battery-plates, showing its laminated formation and on an enlarged scale; and Fig. 6 is a section of one of the oxygen-plates on a still larger scale.

In an ordinary cell, A, I place a rack consisting of two plates, B, preferably of hard rubber, united at top and bottom by rods or tubes C, of insulating material, preferably hard rubber, joined to the plates by screws or other appropriate means. Other rods or tubes, C', also of insulating material, preferably glass, are placed in horizontal rows from top to bottom of the plates B, and rest at their ends in holes in said plates, affording support for the oxygen elements D and the hydrogen elements E of the battery, alternately arranged. I do not, however, confine myself to the use of insulating material for rods C C', although I prefer it.

The oxygen elements are of any suitable construction; but I prefer the laminated perforated plates described in my patent, No. 359,934. These plates are attached to a vertical conducting-strip, F', by solder or other suitable connection, such as angle-pieces *f*. The plates themselves are precisely of the construction described in my patent referred to, except that I place between the sheets of lead-foil a number of layers, G, of carbonized cotton cloth or other carbonized fibrous material, which I find increases the electrical conductivity of the elements and their porosity, and also maintaining conductivity after oxidation of the metallic portions of the plates. Acting in conjunction with the perforations, the carbon secures perfect access of the liquid to all parts of the laminated plates.

In my application above mentioned I have claimed any sort of material inactive in the battery and conductive of electricity placed between the laminæ of a compound plate. I therefore limit this application in this respect to the use of a sheet of carbon, but limit myself to no special material or fabric from which to prepare the sheet of carbon. This carbonized cloth I prepare by subjecting ordinary cloth or other sheet of fibrous material to a high degree of heat while packed in charcoal powder or other substance suitable for the exclusion of oxidizing gases while in the furnace, the degree of heat used being at least a yellow, and preferably a white heat. This high degree of heat I find necessary in order to secure a product having a high degree of conductivity. I do not, however, limit myself to this or any particular construction or form of oxygen element as the one to be used with the other features of my present invention. The hydrogen elements of this cell are each composed of a plate of copper, E, preferably having raised edges, whereby it is given the shape of a tray, and provided with a number of perforations, H, stamped through it, the edges of these perforations being raised above the level of the plate to the same amount as the rim of the plate. In this tray is placed the granulated material, I, preferably the amalgamated zinc referred to in my above-mentioned application, though any other material which is electro-positive with reference to the metal composing the oxygen pole-piece of the cell may be employed.

I do not confine myself to copper as the metal for the plates or trays constituting a part of these elements. Other metals may be used. Copper has the advantage of high conductivity, that it is not acted upon chemically in the presence of zinc, and that trays made of it may be light and thin, taking up the least possible space.

I may here state that I find it best to amalgamate the copper of the trays in order to further guard against electro-chemical action, although enough mercury will usually be taken up by the copper from the liquid or the amalgamated zinc to effect this without special application. While I intend to cover in this application the use of copper of any sort for these supporting trays or plates, I prefer roller-copper, because it best withstands the tendency of mercury to destroy the metallic cohesion of the plates and break them down. Rolled copper is not, in fact, injuriously affected by the mercury, but cast copper is rendered too brittle for convenient use. While I prefer to employ a metallic supporting plate or tray of a metal inert in the electrolyte, it would be within my invention to employ a plate or tray of inert insulating material—such as, for instance, hard rubber—placing therein or not, as preferred, metallic strips to facilitate the access of the current to the mass of amalgamated zinc.

The perforations permit circulation of the fluid through the plates and facilitate battery action; but I do not limit myself to perforated plates, as the perforations may be omitted without seriously detracting from the efficiency of the battery. The plates are attached by bolts J or in other convenient manner to a conducting-strip, K, preferably, but not necessarily, placed diagonally opposite the other conducting-strip, F. The rack formed of the plates B and rods is merely a convenient form of support for the elements. Any other supporting device may be adopted, if preferred.

To prevent endwise movement of the plates in the cell, I insert vertical rods L, the liability to clogging and short-circuiting being thus considerably less than if the ends of the elements fitted against the plates B. The elements are cut away in the vicinity of the conducting-strips, to which they are not attached, to obviate short-circuiting, as indicated in Figs. 1 and 5. The electrical connection to opposite parts of alternate plates causes an even distribution of the current to all parts of each plate, provided the positive and negative plates equal each other in conductivity, as will be the case when they are properly made. In this respect horizontal elements arranged as I have herein shown them have a decided advantage over the ordinary vertical elements alternately connected at their top edges, since in the latter the current always has a tendency to work upon the tops of the elements, and not to the same degree upon the lower parts.

With vertical elements it is impracticable to make the alternate connections to opposed parts of the elements, the bottom edges being inaccessible; but with horizontal elements this is possible and confers a signal advantage.

The construction above described permits of the ready removal of the elements for examination and repairs, it only being necessary to lift out the frame-work and withdraw either of the sets of elements to obtain complete access thereto. In the use of a copper plate as a support for granulated material in a secondary battery I do not confine myself to the horizontal form of plate, but desire to claim such a plate in any position if so shaped as to provide a support for the granulated material.

I do not confine myself to any particular electrolyte in this battery. I may use the ordinary dilute sulphuric acid or dilute sulphuric acid containing a solution of zinc or a solution of mercury, or both, or any other electrolyte which may be found desirable.

By "granulated zinc" in this specification and claims I mean zinc granulated in any of the well-known ways or otherwise finely divided. Sufficient mercury is added to and mixed with the zinc to amalgamate it, as stated in my application before referred to. The amalgamated zinc may be pressed into the trays when the battery-cell is made. Thus the zinc may be heaped into the tray and placed in a power-press and there compressed to flat sheet form, its upper surface on a level with the upturned rims or edges of the tray, or it may be otherwise pressed into the form of a sheet or plate having to a considerable extent a self-supporting consistency; but whether pressure is primarily applied or not the granules become more or less agglomerated and solidified through the action of the mercury, perhaps more or less assisted by the action of the current through the cell until the mass acquires considerable cohesion.

As regards carbonized fabric, I intend to embrace within my invention, as herein claimed, its use in all secondary-battery elements made of layers, strata, sheets, or laminæ, between which the carbonized fabric may be placed. As regards this feature of my invention, the composition of these layers, laminæ, &c., is immaterial. They may be of sheet metal, composite compressed masses, or may be of other construction.

I do not limit myself to the particular form of rack shown, but regard as within my invention any form of removable frame-work adapted to support horizontal elements. While I regard zinc in granulated form as preferable, I may use zinc in the form of a plate or block, and I intend to include this construction in those claims wherein the form of the zinc is not specified.

I do not confine myself in this application to a construction of cell in which there are a number of pairs of elements in the same cell. Many of the improvements herein claimed are equally applicable to a cell containing but a single pair of elements.

Having thus described my invention, what I claim, and desire to protect, is—

1. In a laminated secondary-battery element, two or more layers of material active in the battery, having between them a layer of carbonized cloth or other fabric, substantially as described.

2. In a secondary-battery element, two or more layers of material active in the battery, having between them a layer of cloth or other fabric carbonized at a high degree of heat, substantially as described.

3. In a secondary-battery element, two or more layers of material active in the battery, having between them a layer of carbonized fabric, the compound plate so formed being perforated, substantially as described.

4. In a secondary-battery element, two or more layers of material active in the battery, having between them a layer of carbonized cotton cloth, substantially as described.

5. In a battery-cell, a frame-work for supporting the elements, consisting of two plates connected by rods of insulating material, in combination with oxygen and hydrogen elements supported thereon, substantially as described.

6. In a secondary-battery cell, a set of negative elements electrically connected to each other, a set of positive elements connected to each other, and a rack removable from the cell for supporting the elements, substantially as described.

7. In a battery-cell, a set of negative elements, a set of positive elements, and a rack formed of vertical plates of insulating material connected by rods for supporting the elements, also of insulating material adapted to receive the set of negative elements on one side and the set of positive elements on the other side thereof, substantially as described.

8. The combination, in a battery-cell, of a removable element-supporting rack and a set of elements of like name in the form of horizontal plates connected together so that they can be removed as a unit from the rack, substantially as described.

9. In a battery-cell, a rack consisting of two plates suitably connected to each other and provided with glass rods or tubes supporting the plates and elements resting upon said rods, substantially as described.

10. The combination of the cell A, a rack formed of plates B, connected by rods C and supporting-rods C', of insulating material, and oxygen and hydrogen elements D E, substantially as set forth.

11. A secondary battery having as an element a horizontal copper tray containing granulated electro-positive material, substantially as described.

12. In a secondary battery containing mercury, a plate or tray serving as a support made of rolled copper, substantially as described.

13. A secondary-battery element consisting of a copper tray or plate and amalgamated zinc supported thereby.

14. A secondary-battery element consisting of an amalgamated copper plate or tray supporting granulated material, substantially as described.

15. A secondary-battery element consisting of a perforated tray, the perforations of the tray having upwardly-projecting rims or edges, and the tray containing amalgamated zinc, substantially as described.

16. As a pair of elements for a secondary battery, a lead plate constituting the oxygen element and a copper plate supporting amalgamated zinc constituting the hydrogen element, substantially as described.

17. A secondary battery in which the elements are horizontally arranged, the oxygen elements being of lead and alternating with hydrogen elements of amalgamated zinc, substantially as described.

18. A secondary battery in which the oxygen elements are of lead horizontally placed and alternating with trays supporting amalgamated zinc, substantially as described.

19. A secondary battery in which the oxygen elements are of lead horizontally placed and alternating with copper trays containing amalgamated zinc, substantially as described.

20. A secondary battery in which the oxygen elements are of lead horizontally placed and alternating with perforated copper trays containing amalgamated zinc, substantially as described.

21. As a pair of elements for a secondary battery, a horizontal lead plate constituting the oxygen element and amalgamated zinc constituting the hydrogen element.

22. As a pair of elements for a secondary battery, a horizontal lead plate constituting the oxygen element and amalgamated granulated zinc constituting the hydrogen element.

23. As a pair of elements for a secondary battery, a horizontal lead plate constituting the oxygen element and a copper tray containing granulated zinc constituting the hydrogen element.

24. As a pair of elements for a secondary battery, a horizontal lead plate constituting the oxygen element and a copper tray containing amalgamated granulated zinc as the hydrogen element.

25. As a pair of elements in a secondary battery, a horizontal lead plate constituting the oxygen element and a perforated copper tray containing granulated zinc constituting the hydrogen element.

26. As a pair of secondary battery elements, a horizontal lead plate constituting the oxygen element and a perforated copper tray containing amalgamated granulated zinc constituting the hydrogen element.

27. In a secondary battery, an element consisting of a perforated copper plate or tray serving as a support for the active material, the perforations having upwardly-projecting rims or edges, substantially as described.

28. In a secondary battery, an element consisting of amalgamated zinc and a metallic plate or tray serving as a support for the same, substantially as described.

29. In a secondary battery, an element consisting of finely-divided zinc and a horizontal metallic plate or tray serving as a support for the same, substantially as described.

30. In a secondary battery, an element consisting of amalgamated zinc and a horizontal metallic plate or tray serving as a support for the same, substantially as described.

31. In a secondary battery, an element consisting of amalgamated zinc placed in a horizontal layer upon a supporting-plate or tray of conducting material electrically connected with one of the binding-posts of the battery-cell, substantially as described.

32. In a secondary battery, a series of oxygen and hydrogen elements placed vertically one above the other in a single cell, the hydrogen elements consisting of metallic plates or trays containing amalgamated zinc, substantially as described.

33. In a secondary battery, a series of oxygen and hydrogen elements placed vertically one above the other in a single cell, the hydrogen elements consisting of metallic plates or trays containing finely-divided zinc, substantially as described.

34. In a secondary battery, a series of oxygen and hydrogen elements placed vertically one above the other in a single cell, the hydrogen elements consisting of copper plates or trays containing finely-divided zinc, substantially as described.

35. In a secondary battery, a series of oxygen and hydrogen elements placed vertically one above the other in a single cell, the hydrogen elements consisting of copper plates or trays containing amalgamated zinc, substantially as described.

36. In a secondary battery, a series of oxygen and hydrogen elements placed vertically one above the other in a single cell, the hydrogen elements consisting of perforated copper plates or trays containing amalgamated zinc, substantially as described.

37. A secondary-battery element consisting of a plate or tray of material substantially inert in the electrolyte and having a mass of finely-divided metal conformed thereto and solidified thereon in the presence of mercury, substantially as described.

38. A secondary-battery element consisting of a horizontal plate or tray of material substantially inert in the electrolyte and having a mass of zinc conformed thereto and solidified thereon in the presence of mercury, substantially as described.

In testimony whereof I have hereunto set my hand in the presence of two subscribing witnesses.

WILLIAM MAIN.

Witnesses:
D. PETRI-PALMEDO,
J. J. KENNEDY.